US008265871B1

(12) United States Patent
Starns et al.

(10) Patent No.: US 8,265,871 B1
(45) Date of Patent: Sep. 11, 2012

(54) MOBILE RECORD INFORMATION ENTRY AND GEOTAGGING

(75) Inventors: Alexander Thomas Starns, Redwood City, CA (US); Matthew Lawrence Williams, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,102

(22) Filed: Sep. 29, 2011

Related U.S. Application Data

(63) Continuation of application No. 13/077,172, filed on Mar. 31, 2011.

(51) Int. Cl.
*G01C 21/26* (2006.01)

(52) U.S. Cl. ........ 701/451; 701/461; 701/517; 707/919; 455/456.3

(58) Field of Classification Search .................... 701/208
See application file for complete search history.

(56) References Cited

U.S. PATENT DOCUMENTS

| | | | | |
|---|---|---|---|---|
| 6,115,611 | A * | 9/2000 | Kimoto et al. | 455/456.3 |
| 6,829,484 | B1 * | 12/2004 | Kimoto et al. | 455/456.1 |
| 7,236,797 | B2 * | 6/2007 | Kimoto et al. | 455/456.1 |
| 7,953,873 | B1 * | 5/2011 | Madurzak | 709/229 |
| 8,131,118 | B1 * | 3/2012 | Jing et al. | 382/305 |
| 2004/0139049 | A1 * | 7/2004 | Hancock et al. | 707/1 |
| 2004/0198395 | A1 * | 10/2004 | Kimoto et al. | 455/456.1 |
| 2005/0283503 | A1 * | 12/2005 | Hancock et al. | 707/200 |
| 2007/0208740 | A1 * | 9/2007 | Nye | 707/6 |
| 2008/0076451 | A1 * | 3/2008 | Sheha et al. | 455/456.3 |
| 2008/0132251 | A1 * | 6/2008 | Altman et al. | 455/457 |
| 2009/0070290 | A1 * | 3/2009 | Nye | 707/2 |
| 2009/0077100 | A1 * | 3/2009 | Hancock et al. | 707/10 |
| 2009/0299824 | A1 * | 12/2009 | Barnes, Jr. | 705/10 |
| 2010/0023259 | A1 * | 1/2010 | Krumm et al. | 701/208 |
| 2010/0076994 | A1 * | 3/2010 | Soroca et al. | 707/769 |
| 2011/0258046 | A1 * | 10/2011 | Ramer et al. | 705/14.53 |
| 2011/0258049 | A1 * | 10/2011 | Ramer et al. | 705/14.66 |
| 2011/0288911 | A1 * | 11/2011 | Barnes, Jr. | 705/14.1 |
| 2012/0036015 | A1 * | 2/2012 | Sheikh | 705/14.54 |
| 2012/0047147 | A1 * | 2/2012 | Redstone et al. | 707/748 |
| 2012/0089996 | A1 * | 4/2012 | Ramer et al. | 725/14 |

* cited by examiner

*Primary Examiner* — Shelley Chen
(74) *Attorney, Agent, or Firm* — Sterne, Kessler, Goldstein & Fox P.L.L.C.

(57) ABSTRACT

Mobile record information entry and geotagging methods and systems are disclosed. A method for managing an accurate collection of geographical information system (GIS) data over the World Wide Web from a plurality of mobile computing devices operated by different users at various locations in a geographical area is disclosed. A browser may allow a user of a mobile computing device to enter record information associated with businesses based on observations made at different locations and may add geographical tags to the record information to obtain geotagged record information. The geographical tags may include geospatial location information that specifies the current geographical location of a mobile computing device at the time of user entry. GIS data may be updated based on the geotagged record information received from the browser.

21 Claims, 8 Drawing Sheets

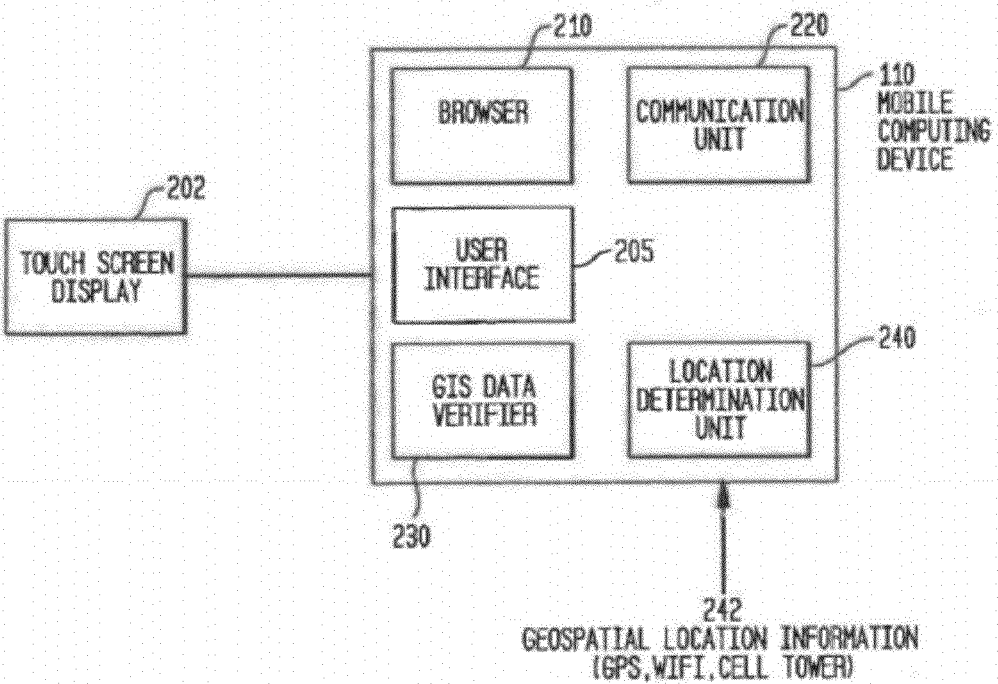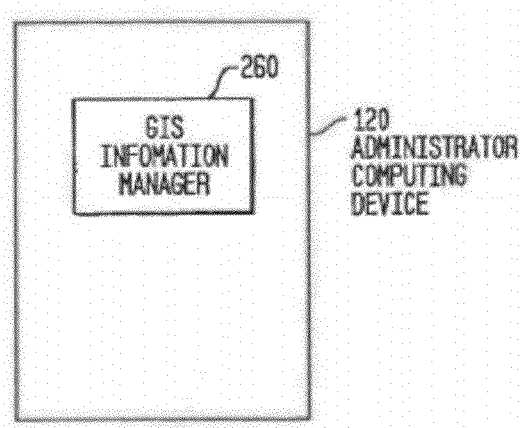

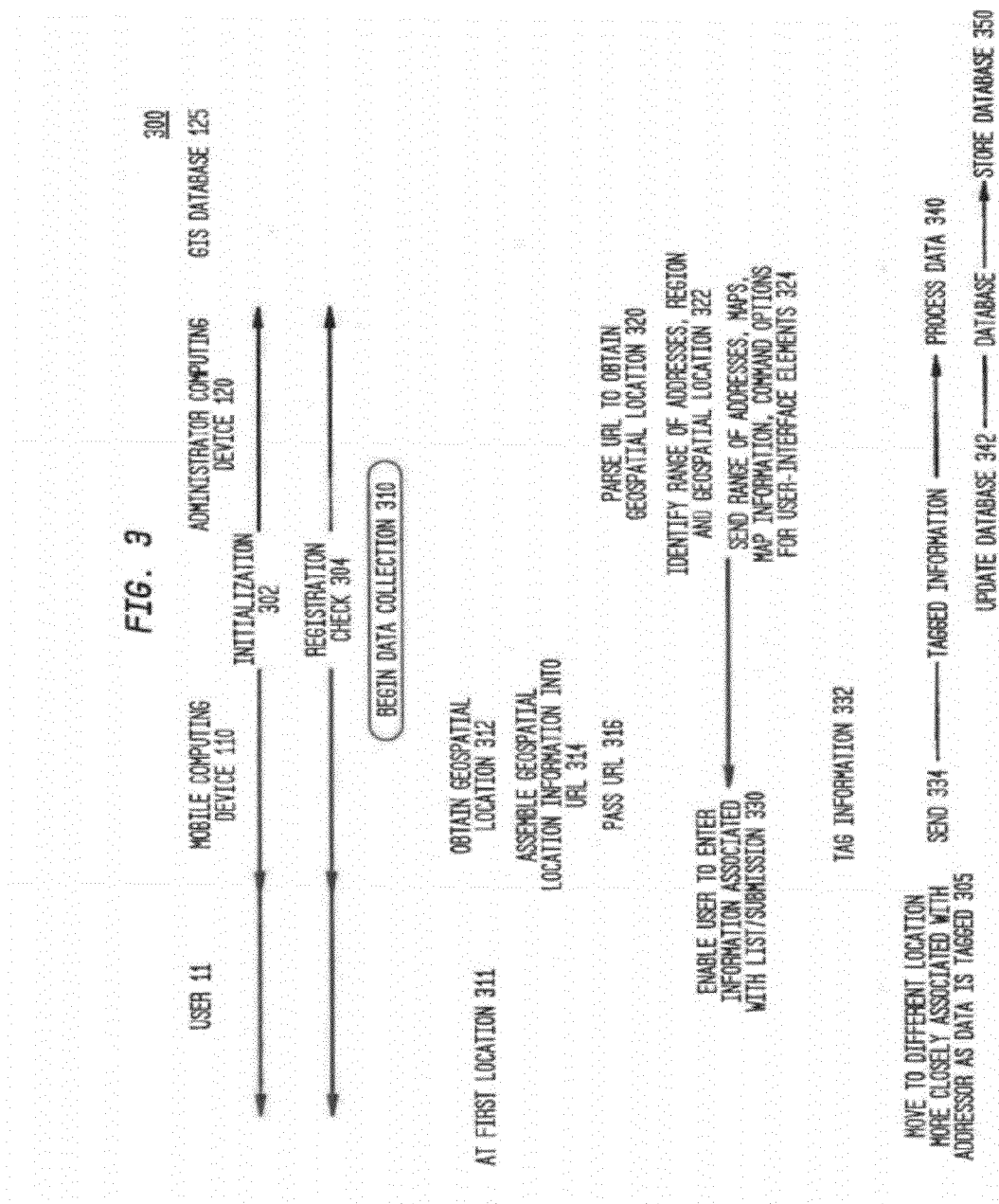

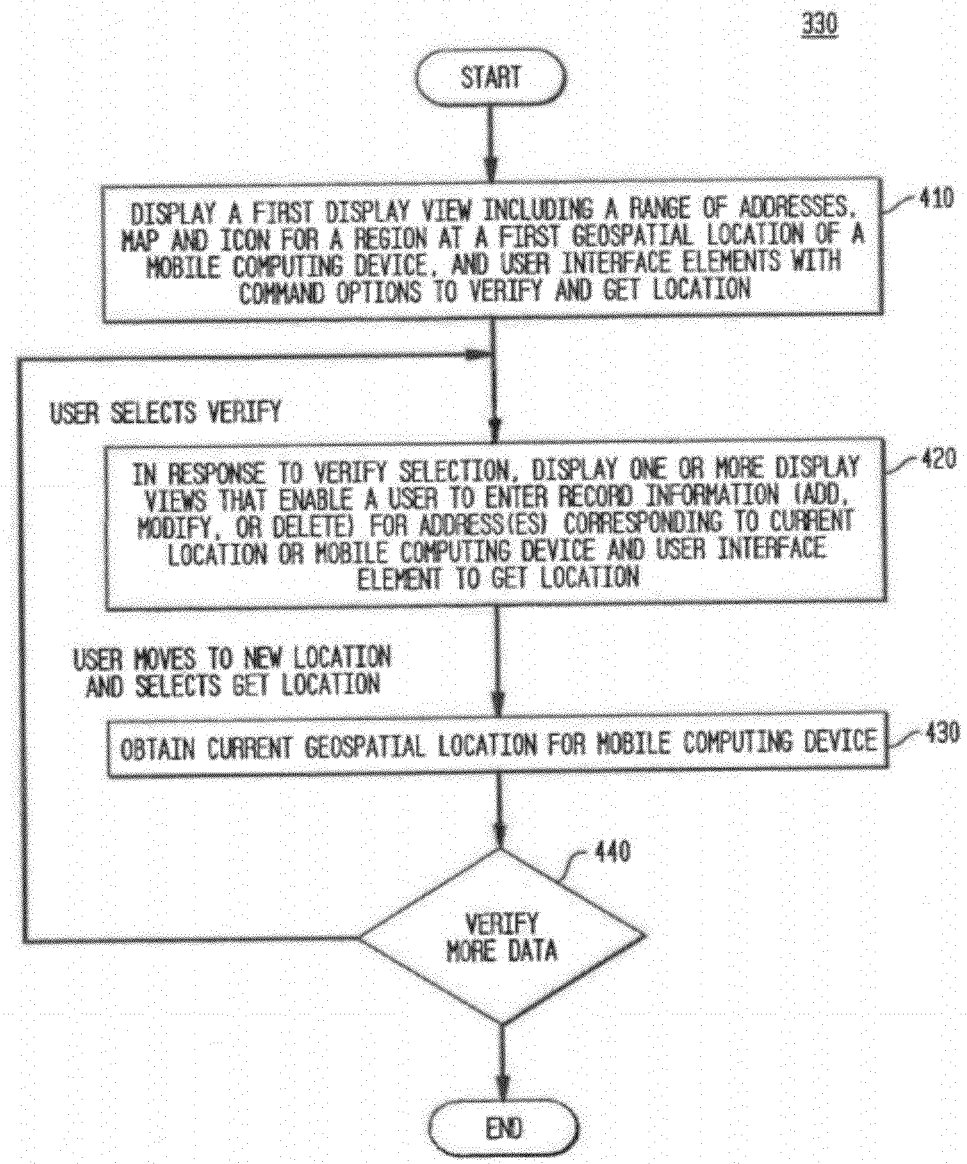

FIG. 5B

Business Record Type Account for address:
409 E 18th St
Sioux Falls, SD 57104

☐ Show Confirmed

[Get Location] — 507

▷ Select Business

| | Business Name | Street No | Street Name | Phone | Status | Follow Up | Complex |
|---|---|---|---|---|---|---|---|
| Select | Bbtest4 | 401-499 | E 18th St | | | | |
| Select | Bbtest5 | 401-499 | E 18th St | | | | |
| Select | Bbtest3 | 409 | E 18th St | | | | |
| Select | Bbtest2 | 409 | E 18th St | | | | |
| Select | Bbtest | 409 | E 18th St | | | | |

▷ Add New Location
[New Address] — 515

Business Information

Business Category: Banking and Finance
Business Specialty: --None--

Business Category Type: --None--
Business Sub-Specialty: --None--
Bank or ATM

520

525 — Next

FIG. 5D

Business Information

| | |
|---|---|
| Account Name | Bbtest4 |
| Shipping Street | 401-499 E 18th St |
| Suite Number | |
| Website | |
| Phone | |
| Shipping City | Sioux Falls |
| Shipping State/Province | SD |
| Shipping Zip/Postal Code | 57104 |

Location

| | |
|---|---|
| Street No | 401-499 |
| Latitude | 43.5350513 |
| GPS Accuracy | 10 |
| Assumed Address | ☐ |
| Street | E 18th St |
| Longitude | -96.72152366 |

Business Hours

| Day | Closed | Open | Closed | Open | Closed |
|---|---|---|---|---|---|
| Monday | ☐ | [>] [-] | [>] [-] | [>] [-] | [>] [c][d] |
| Tuesday | ☐ | [>] [-] | [>] [-] | [>] [-] | [>] [c][d] |
| Wednesday | ☐ | [>] [-] | [>] [-] | [>] [-] | [>] [c][d] |
| Thursday | ☐ | [>] [-] | [>] [-] | [>] [-] | [>] [c][d] |
| Friday | ☐ | [>] [-] | [>] [-] | [>] [-] | [>] [c][d] |
| Saturday | ☐ | [>] [-] | [>] [-] | [>] [-] | [>] [c][d] |
| Sunday | ☐ | [>] [-] | [>] [-] | [>] [-] | [>] [c][d] |

Add

[Submit] (done)

Save | Cancel

MOBILE RECORD INFORMATION ENTRY AND GEOTAGGING

CROSS REFERENCE TO RELATED APPLICATIONS

This application is a continuation of U.S. patent application Ser. No. 13/077,172, filed Mar. 31, 2011, which is hereby incorporated by reference in its entirety.

BACKGROUND OF THE INVENTION

Information is increasingly being used in a variety of forms and platforms, including by a variety of applications and services that are available over computer networks such as the Internet. Geographical information system (GIS) information is especially increasing in its popularity and use. GIS information can be any type of geographical information or information related to location. A variety of web services such as mapping services, directory services, search engines, on-line advertising services, government services, and other business services are accessing or otherwise using GIS information as part of their businesses. Increasingly, however, the reliability and accuracy of such geographical information covering a variety of locations has caused problems.

The collection, entry and maintenance of GIS information presents unique challenges. GIS data is often collected from a variety of sources using different location based identification systems or inputs. For example, geographical information such as satellite imagery is often obtained with corresponding satellite information data such as longitude and latitude. This satellite imagery, however, is captured independent of on-the-ground location information such as mailing addresses or other location based addressing schemes. Other GIS information, such as, the location of businesses along streets, is often received from different data records or originally captured without any reference to geographical location. Additionally some of this information, as it is collected from different sources or is originally incomplete, may conflict.

Challenges with maintaining and updating GIS information arise in many situations. In some cases, geographical information has errors in its original collection that need to be corrected. In other cases, potentially accurate data needs to be verified, or data that was accurate has changed and needs to be modified. For example, geographical information often needs to be updated in accordance with changes in a business area or condition, such as when a business closes or new businesses open, or when building zoning or development changes impact a street or neighborhood. These challenges to updating GIS information are especially difficult given that changes in a business area or situation are not likely to be automatically detected by any currently existing system.

BRIEF SUMMARY OF THE INVENTION

Embodiments of the present invention relate to mobile record information entry and geotagging. Users may use mobile computing devices to enter record information associated with locations at which the users are present. The entered record information may be automatically geotagged on the mobile computing device to obtain geotagged record information having geographical tags. These tags may include geospatial location information obtained by a location determination unit that specifies the current geographical location of the respective mobile computing device at the time of user data entry. A communication unit may send the geotagged record information from the browser to a remote administrator computing device for storage in a GIS database.

In an embodiment, a method for managing collection of geographical information system (GIS) data over a network is provided. The method includes receiving a universal resource locator passed from a browser of a mobile computing device. The universal resource locator includes geospatial location information that specifies a current geographical location of the mobile computing device at the time of record information entry. Further steps are parsing the universal resource locator to obtain geospatial location information, identifying a list of businesses within a region at the geographical location, and sending the identified list of businesses to the browser.

The method further includes receiving geotagged record information from the browser and updating a database based on the received geotagged record information. The geotagged record information may include record information associated with the listed businesses and entered by a user of the browser based on observations made by the user at different locations corresponding to the respective listed businesses and may include geographical tags having geospatial location information that specifies the current geographical location of the mobile computing device at the time of user record information entry.

In another embodiment, a system for managing collection of geographical information system (GIS) data over a network includes an administrator computing device having an GIS information manager, and a GIS database coupled to the administrator computing device. The GIS information manager receives a universal resource locator passed from a browser of a mobile computing device, parses the universal resource locator to obtain the geospatial location information, identifies a list of businesses within a region that includes the geographical location of the obtained geospatial location information, and outputs the identified list of businesses to the browser. The GIS information manager further receives the geotagged record information from the browser and outputs updates to data stored in the GIS database based on the received geotagged record information.

In a further embodiment, a method includes enabling a user through a browser at a mobile computing device to enter record information associated with lists of businesses based on observations made by the user at different locations corresponding to the respective listed businesses. This method includes automatically geotagging the record information entered by the user to obtain geotagged record information having geographical tags including geospatial location information that specifies the current geographical location of the mobile computing device at the time of user record information entry, and sending the geotagged record information from the browser to a remote administrator computing device for storage in a GIS database.

An apparatus in an embodiment includes a GIS data verifier and a communication unit. The GIS data verifier may be implemented on a mobile computing device having a browser and a location determination unit. The GIS data verifier enables a user through the browser at the mobile computing device to enter record information associated with lists of businesses based on observations made by the user at different locations corresponding to the respective listed businesses, and automatically geotags the record information entered by the user to obtain geotagged record information having geographical tags including geospatial location information obtained by the location determination unit that specifies the current geographical location of the mobile computing device at the time of user record information entry. The communication unit sends the geotagged record information from the browser to a remote administrator computing device for storage in a GIS database.

In still further embodiments, methods and systems for managing an accurate collection of geographical information system (GIS) data over the World Wide Web from a plurality of mobile computing devices operated by different registered users at various locations in a geographical area is provided.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 2A is a diagram that shows a mobile computing device in further detail according to an example.

FIG. 2B is a diagram of an administrator computing device, including a GIS information manager according to an example.

FIG. 3 is a diagram that shows a process flow for carrying out entry of record information, automatic geotagging and associated GIS information management according to an embodiment.

FIG. 4 is a flowchart illustrating more detailed operations of the enabling step of FIG. 3, according to an example.

FIG. 5B is a screenshot illustrating a display view that may be presented to a user and that may enable the user to enter record information according to an example.

FIG. 5C is a screenshot illustrating a display view that may be presented to a user and that may enable the user to enter record information according to an example.

FIG. 5D is a screenshot illustrating a display view that may be presented to a user and that may enable the user to enter record information according to an example embodiment.

DETAILED DESCRIPTION OF THE INVENTION

Figure 1:
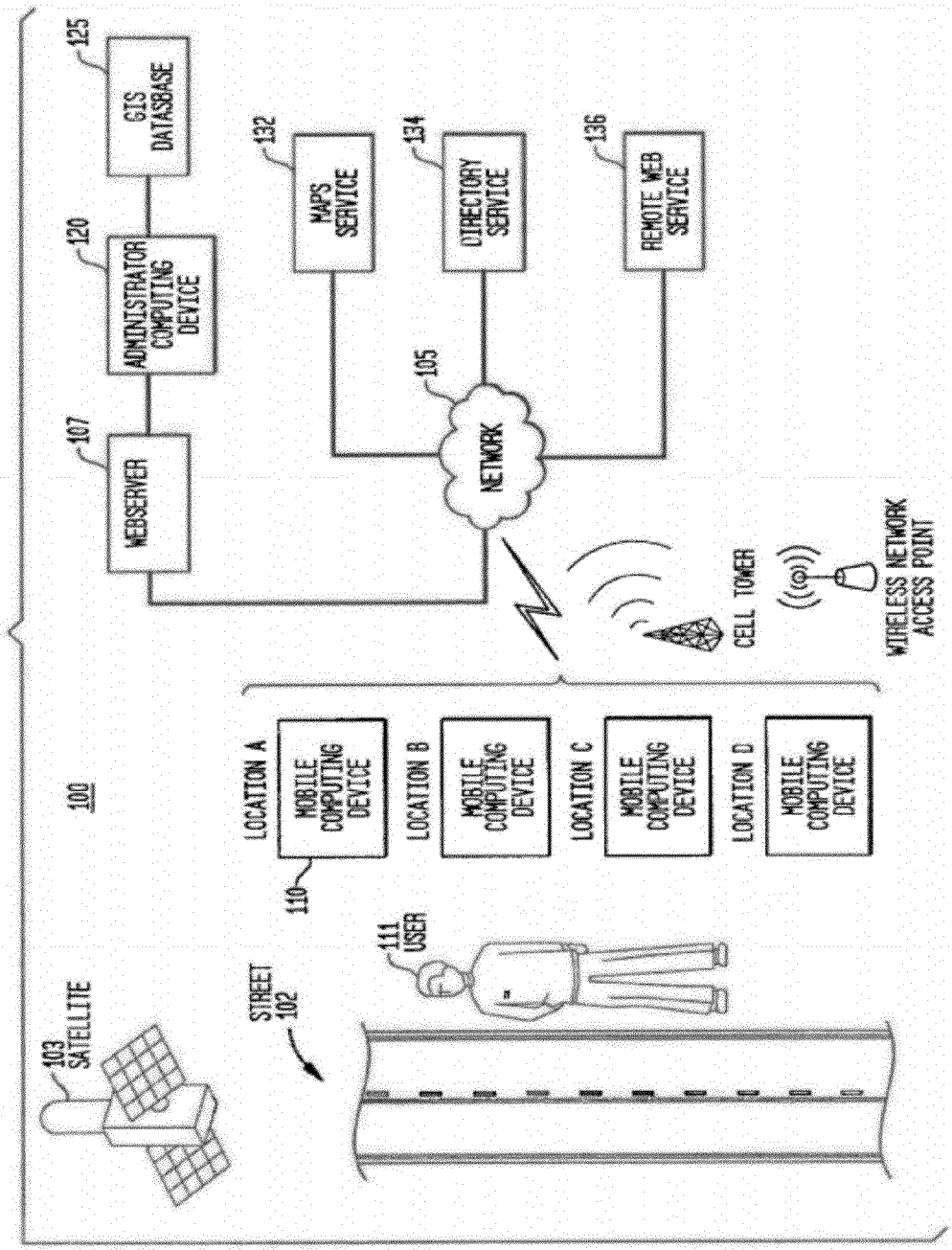
FIG. 1 is a diagram of an environment for mobile record information entry and geotagging according to an embodiment.

Embodiments of the present invention relate to mobile record information entry and geotagging.

While the present disclosure is made with reference to illustrative embodiments for particular applications, it should be understood that the disclosure is not limited thereto. Those skilled in the art with access to the teachings herein will recognize additional modifications, applications, and embodiments within the scope thereof and additional fields to which the disclosure would apply. Disclosed herein are various embodiments for mobile record information entry and geotagging.

In one embodiment, to enter record information and automatically have it geotagged, a user may carry around a mobile computing device (such as a mobile phone, laptop or tablet PC) to various locations in a neighborhood. At each location, the user may verify (including adding, deleting and/or verifying) data that exists about that location. The mobile computing device may track the user's current location and communicate that location to a server that may provide to the user, via the mobile computing device, at least a subset of the geospatial and/or geographical (GIS) information available at or near the user's current location.

Example information about the location of the user may include businesses and/or other amenities that are located within a specified radius of the user's determined location. The user may then verify the information that the user receives about the determined location. For example, the user may verify whether a given business is still operating, add information such as operating hours, include whether any new businesses are operating the area (e.g., that may not have been provided to the user), describe what amenities and/or visual markers are around the area (e.g., whether there is a park, water fountain, bike trail, etc.) and/or provide any other information the user deems relevant to the user's location. This information, as verified by the user, may then be provided back to the server with a geospatial tagging of the user's location. The geospatial tagging may include, for example, when and/or where the user was when the information was verified. For example, the user's specific location on a street, or in a neighborhood may be provided via a geospatial tag.

Allowing the user to provide information that is automatically geospatially tagged by a mobile computing device may allow the server (or other web or data collection system) to maintain a more accurate database or other storage of geospatially relevant (e.g., GIS) information. For example, a user who verifies information from a business while standing in, at or near the business entrance may be deemed more accurate than information provided without the ability to observe conditions of a location in person. Furthermore, the geospatially tagged information may also allow the system or server collecting the information to collect the user's precise geospatial information as in reference to the business. Then for example, rather than simply having a street, mailing or other geographical address or location of a business, the system may also have collected specific longitudinal and/or latitudinal information about where precisely, the business entrance is located. This may allow the system, according to an example embodiment, provide other users with specific information about businesses near them when they are standing at specific geospatial and/or geographic locations. For example, a business that exists on the corner of two streets might have geotagged information indicating on which street the entrance is located.

As shown in FIG. 1, an environment 100 may include a mobile computing device 110, a network 105, a web server 107, an administrative computing device 120, a GIS database 125 and one or more web services (e.g., a map service 132, a directory service 134, and/or other one or more other remote web service(s) 136). In the example of FIG. 1, the user 111 may carry or otherwise transport the mobile computing device 110 to a number of different locations (e.g., A, B, C, and D). These locations may be along or otherwise located near a street 102.

The mobile computing device 110 may be coupled to or otherwise configured to communicate with the network 105. As the user 111 carries or otherwise transports the mobile computing device 110 to and between the different locations (for example from location A to location B), the user 111 may verify record information at one or more of the locations. The phrases "verify information" and "enter information," and any like phrases used herein, may be used interchangeably herein and shall be understood to include any record and/or information verification, modification and/or manipulation, including but not limited to entering information, verifying existing information, deleting information, and/or otherwise updating or modifying information.

As the user transports the mobile computing device 111 to the different locations, the user 111 may initiate an entry of record information about the location where the user is currently located. In other example embodiments, the entry of record information may be initiated by another source, other than the user, such as by the mobile computing device 110 and or by a device communicating with the mobile computing device 110 via the network 105. For example, the mobile computing device 111 may determine that the user 111 is in or has entered a new location and then based, at least in part, on this determination the mobile computing device 111 may prompt the user 111 for data verification.

The mobile computing device 110 may be equipped with satellite connectivity, e.g., to one or more of the satellites 103 as shown in the environment 100. The satellite connectivity may be used to help determine the geographical and/or geospatial location of the user 111 and/or the mobile computing device 110. For example, the mobile computing device 110 through its communication with the satellite may be able to effect or otherwise determine global positioning system (GPS) coordinates for its current location. In other example embodiments, the mobile computing device 110, depending on its connectivity, may also and/or alternatively be able to obtain location information (including GPS coordinates) from nearby cell towers, wireless network access points, and/or other indicators capable of communicating or indicating the current location of the mobile computing device 111.

According to one embodiment, the mobile computing device 110 may incorporate GPS coordinates gleaned from or otherwise determined by one or more of its chips or circuitry. For example, the mobile computing device 110 may include a tablet computer that includes hardware, firmware, chips and/or other circuitry configured to or otherwise capable of determining the GPS coordinates or location of the mobile computing device 110. The mobile computing device 110 may then pass its determined location as universal resource locator (URL) parameters. For example, the mobile computing device 110 may provide a text string URL indicating its current location to the network 105 through a browser. The URL may be generated without any additional actions by the user other than the verification of information about the user's geographical location. This communication between the network 105 and the mobile computing device 110 may occur via a communication unit. Such a communication unit may include any type of network interface or input/output device supporting wireless communication including but not limited to communication via a Wi-Fi or cellular link.

The network 105 may then pass the URL information received from the mobile computing device 110 to one or more devices connected to the network, (e.g., maps service 132, webserver 107, directory service 134, remote web service 136), which may parse the URL and return to the mobile computing device 110 a list of businesses (or other information) within a specified radius of the GPS coordinates or other location determination information of the user 111 (as determined from the URL). The term "list" as used herein broadly refers to any set of data in any type of order or arrangement.

The following is an example URL that may be passed, and that includes, according to an exemplary embodiment, latitudinal and longitudinal coordinates.

https://c.na7.visual.force.com/apex/FootprintMap?lat=43.4974555&lon=−96.6820043&acc=40

As may be seen in the example URL above, the URL may include, embedded within the text string a latitudinal (lat) and/or longitudinal (lon) coordinates of the user's 111 current location, and accuracy information about the relative accuracy of the location determination.

The user 111 may choose from the list of business (or other information provided to the user 111) which information to verify, edit, delete, and/or supplement. This information as provided by the user 111 may allow the system to store, process and/or provide more accurate data about the geospatial location, geographical location and/or businesses where the user 111, or more specifically the mobile computing device 110, is located. For example, the user 111, standing in front of a business entrance or location A, may enter or receive a list of businesses at or near (e.g., within a 2 block radius of) location A. The user 111 may then verify one or more of those businesses and/or enter record information through a record information entry system (using the mobile computing device 110). The entered record information may include any number of data parameters or categories including, but not limited to, business type, business specialty, business name, business address, business operating characteristics data, neighborhood features, and amenities data. In addition, the user may also create new records in cases where no prior information is available for a particular location.

The user 111 may then move to a different location, e.g., location B and initiate a similar process to verify record information about location B. This record information may also automatically be geotagged based on the user's 111 (or more specifically mobile computing device's 110) current location at location B and sent over the network 105. The network 105 may then provide this information (e.g., through the webserver 107) to the administrator computing device 120 that may host the record information prior to entry in the GIS database 125. While the administrator computing device 120 may update the GIS database 125 with information it has received from the user 111, in other example embodiments, the received information may need to undergo some other verification checks prior to updating the GIS database 125. The GIS database 125 may be any type of database or other storage structure including, but not limited to a relational database and may include information stored on one or more storage devices, e.g., a magnetic or optical storage device including but not limited to a mass storage device or a remote cloud-based storage service having storage devices.

The map service 132, directory service 134, and remote web service 136 (which may include any other web service) may then access the updated record information stored on administrator computing device 120 and/or the GIS database 125. According to an example embodiment, the information as updated by and/or stored and accessed from the administrator computing device 120 may be indicated as being newly updated and/or provisionally updated information about the different locations.

In the environment 100, the user 111 may be able to move with or otherwise transport the mobile computing device 110 to any number of different locations and send updated record information for further processing and/or eventual updating in the GIS database 125. In one example embodiment, an additional confidence score or other relatively high value may be assigned to the updated data indicative of the higher confidence that may be associated when a user (e.g., 111) is standing at a current location observing the record information associated with that location and verifying the data. In another example embodiment, if the user 111 indicates that the user 111 is standing near (e.g., within 10 feet of) Business A1, then the updated information as received from the user 111 may include a more specific GPS coordinate location of Business A1 as in reference to location A and/or other businesses (e.g., Business A2, A3, etc.) that may exist in a similar location.

FIG. 2A is a diagram that shows a mobile computing device 110 in further detail according to an example embodiment. The mobile computing device 110 may include any type of mobile computing device including but not limited to smart phones, laptops and tablet computers. Example embodiments of the mobile computing device 110 may include a mobile computing device having a touch screen display such as smart phone with touch input or tablet computer with touch input.

As shown in FIG. 2A, the mobile computing device 110 may include a touch screen display 202, a user interface 205, a browser 210, a communication unit 220, a GIS data verifier 230, and a location determination unit 240. In one example embodiment, the browser 210, GIS data verifier 230 and location determination 240 may be implemented in software, firmware, hardware and/or any combination thereof. The location determination unit 240 may be implemented in hardware, e.g., GPS chipset, antenna and/or other appropriate controllers software, firmware or hardware as would be understood by a person skilled in the art. The user interface 205 may include any type of user interface or coupling, between a touch screen 202 and other components on the mobile computing device 110, including but not limited to the GIS data verifier 230 and the browser 210.

The touch screen display 202 can be any type of touch screen display including but not limited to a display that enables a user to click or otherwise manipulate the images of the display screen with a finger, stylus and/or other object. The touch screen display 202 may also allow the user to verify and/or otherwise input information. Though a visual display of information is commonly known for touch screen displays, the information may be provided to and/or be otherwise verifiable by the user through other means as well, such as audio.

The browser 210 may include be any type of browser. The communication unit 220 may include a GPS chip, or other output device for communicating with satellites, cell towers, and/or network access points. The communication unit 220 may be configured or capable to automatically determine the location (e.g., GPS coordinates) of the mobile computing device 110, as referenced above.

The GIS data verifier 230 may allow a user to verify data received from an administrator computing device (120) through the browser 210. For example, the user may input and/or otherwise verify the data received from the administrator computing device (120) about the mobile computing device's 110 current location, through the browser 210. The GIS data verifier 230 is described in further detail below with respect to FIGS. 3-5D.

The location determination unit 240 may be any type of unit for determining the current location of the mobile computing device 110. For example, location determination unit 240 may obtain geospatial position information 242 (e.g., latitude and/or longitude information) from a GPS chip and/or the communication unit 220 (which in some embodiments may include a GPS chip). The location determination unit 240 may obtain a location of or otherwise locate a cell tower, satellite and/or network access point, with which the communication unit 210 may communicate. Such geospatial location information 242 may also be input to the mobile computing device 110 through the communication unit 220 to determine the mobile computing device's 110 location. In an example embodiment, a user may be able to verify and/or otherwise edit the geospatial location information 242 as determined by the mobile computing device 110.

FIG. 2B is a diagram of an administrator computing device 120, including a GIS information manager 260 according to an example embodiment. The operation of the GIS information manager 260 will be described in further detail below with respect to FIG. 3.

The administrator computing device 120 and its component module GIS information manager 260 may be implemented in software, firmware, hardware and/or any combination thereof. The administrator computing device 120 may include, but is not limited to, a server running on a computing device or a cluster of servers running on a cluster of computer devices. According to an example embodiment, the administrator computing device 120 may be any type of computing device including but not limited to one or more processors in associated memory, global computer, desktop computer, workstation, server cluster computers or others. According to an example embodiment, the GIS information manager 260 may be implemented in software, firmware and/or hardware and/or otherwise executed on the administrator computing device 120.

FIG. 3 is a diagram that shows a process flow 300 for carrying out entry of record information, automatic geotagging and associated GIS information management according to an example embodiment. As shown in the swim lane diagram, the process 300 proceeds from the top to the bottom and the steps may be carried out by different components, e.g., user 111, mobile computing device 110, administrator computing device 120 and GIS database 125. The order of steps 302-350 and components performing the steps are presented here for clarity and the steps may be performed in a different order by different components as would be apparent to a person skilled in the art given the description herein.

At step 302, an initialization process may be performed. The initialization 302 may include the user 111 logging on to the mobile computing device 110 (and/or a process, program or other application running on the mobile computing device 110). The user 111 (though the mobile computing device 110) may then initiate or otherwise establish connectivity to the administrator computing device 120. The administrator computing device 120 may establish connectivity with the GIS database 125.

Step 304, a registration check process may be performed. The registration check 304 may include any type of registration or authentication check of the user 111 and/or the mobile computing device 110. For example, the user 111 may enter log in information, e.g., a user name and/or password through the browser (210) of the mobile computing device 110. This information may then be verified by a separate entity or other remote web service (136) not shown. According to an example embodiment, one such a registration process may be managed by a separate remote registration service provider (not shown). Once the user information has been verified and the authenticity of the user 111 and/or the mobile computing device 110 has been established, a notification may be sent to the administrator computing device 120 indicating that the registration check 304 has completed.

A registered user (e.g., the user 111 who has completed registration check 304) may then begin a series of steps that may be carried out for data collection/verification. As shown in FIG. 3, the data collection may begin at step 310 and may proceed through step 350.

At step 311, the user 111 may begin data collection at a first location (e.g., location A as shown in FIG. 1). At step 312, the mobile computing device 110 may then obtain geospatial location information about the location. As referenced above, the mobile computing device 100 may include a location determination unit (240) and a communication unit (220) that may obtain or otherwise determine the current geospatial location information of the mobile computing device 110 (and consequently the associated user 111 operating the mobile computing device 110).

At step 314, the mobile computing device 110, after obtaining, calculating or otherwise determining the geospatial location information, may then provide or assemble the geospatial location information into a universal resource locator (URL) text string. At step 316, the assembled URL (including the embedded or otherwise provided geospatial location information) may then be passed to the administrative computing device 120.

In one embodiment, steps 312, 314 and 316 may be performed by or otherwise under the control of the GIS data verifier 230. For example, in performing step 312, the GIS data verifier (230) may instruct the location determination unit (240) to obtain the geospatial location information (242). In performing step 314, the GIS data verifier (230) may assemble the geospatial location information (242) from the location determination unit (240) into a URL. In step 316, the GIS data verifier (230) may pass the assembled URL through a browser (210) to the GIS information manager (260) running on the administrator computing device 120.

According to an example embodiment, the administrative computing device 120 including the GIS information manager (260) may perform steps 320-324. At step 320, in response to the receipt of the URL, the GIS information manager (260) may parse the URL to obtain the geospatial location information of the mobile computing device 110. At step 322, the GIS information manager (260) may identify a range and/or list addresses at the geospatial location. For example, the addresses may correspond to those addresses that are within a specified radius of the determined geospatial location of the mobile computing device 111. At step 324, the GIS information manager (260) may then send or otherwise transmit the identified addresses, map information and command options for user interface elements back to the GIS data verifier (260). The mobile computing device 110 may then display or otherwise provide this information to the user 111 via the touch screen display (202). In an example embodiment, the information may be provided to the user 11 via the browser (210).

At step 330, the user 111 (of the mobile computing device 110) may then be able to enter or otherwise verify the record information associated with a list of businesses (and/or other GIS information that may have been received). At step 332, the record information that is verified, changed or otherwise entered by the user 111 may be automatically geotagged by the GIS data verifier (230). For example, the GIS data verifier (230) may determine the geospatial location information (242) from location determination unit (240) as described above with respect to step 312. The GIS data verifier (230) may then geotag the record information as entered and/or verified by the user 111.

In other example embodiments, the geospatial location information (242) may be updated in step 332 immediately prior to tagging to ensure that the information is tagged with the most up-to-date location of the mobile computing device 110. In step 305, if the user 111 may move to a new location, and the user 111 may continue to enter record information. In an example embodiment, the GIS data verifier (230) may then request a location update and may provide the updated location reflective of the current location (of the mobile computing device 110 and operating user 111) as the geotag. This way the user 111 may move to a number of different locations (e.g., locations A-D from FIG. 1), and may continue to enter record information that may be automatically geotagged that may be returned or otherwise transmitted back to the administrator computing device 120.

At step 334, the geotagged record information may be sent or otherwise transmit to the administrator computing device 120, which may be received by the GIS information manager (260). At step 340, the GIS information manager (260) may process the received geotagged record information. At step 342, the GIS information manager (260) may determine that the GIS database 125 is to be updated based on the received geotagged record information and may update the GIS database 125. In other example embodiments, the GIS information manager (260) may determine at step 342 that the GIS database 125 is not to be updated based on the received geotagged record information. For example, the GIS information manager (260) may determine that the received information is incomplete, unreliable or otherwise requires something extra before the GIS database 125 is to be updated. Then for example, the updated information as provided by the user 111 may be discarded, buffered pending further verification of the user's reliability and/or marked as unverified information.

At step 350, the GIS database 125 may store the updated, geotagged information as received from the user 111. In some example embodiments, the information may be stored in the GIS database 125 and may be marked as recently updated, new or with another informational tag for a period of time or until the occurrence of an event.

FIG. 4 is a flowchart illustrating more detailed operations of the enabling step 330 of FIG. 3, according to an example embodiment. At step 410, a first display view including a range of addresses, a map, and an icon for a region at a first geospatial location of a mobile computing device may be displayed. The first display view may include user interface elements with command options to verify and get location information. An example first display is shown in FIG. 5A.

Figure 5A:
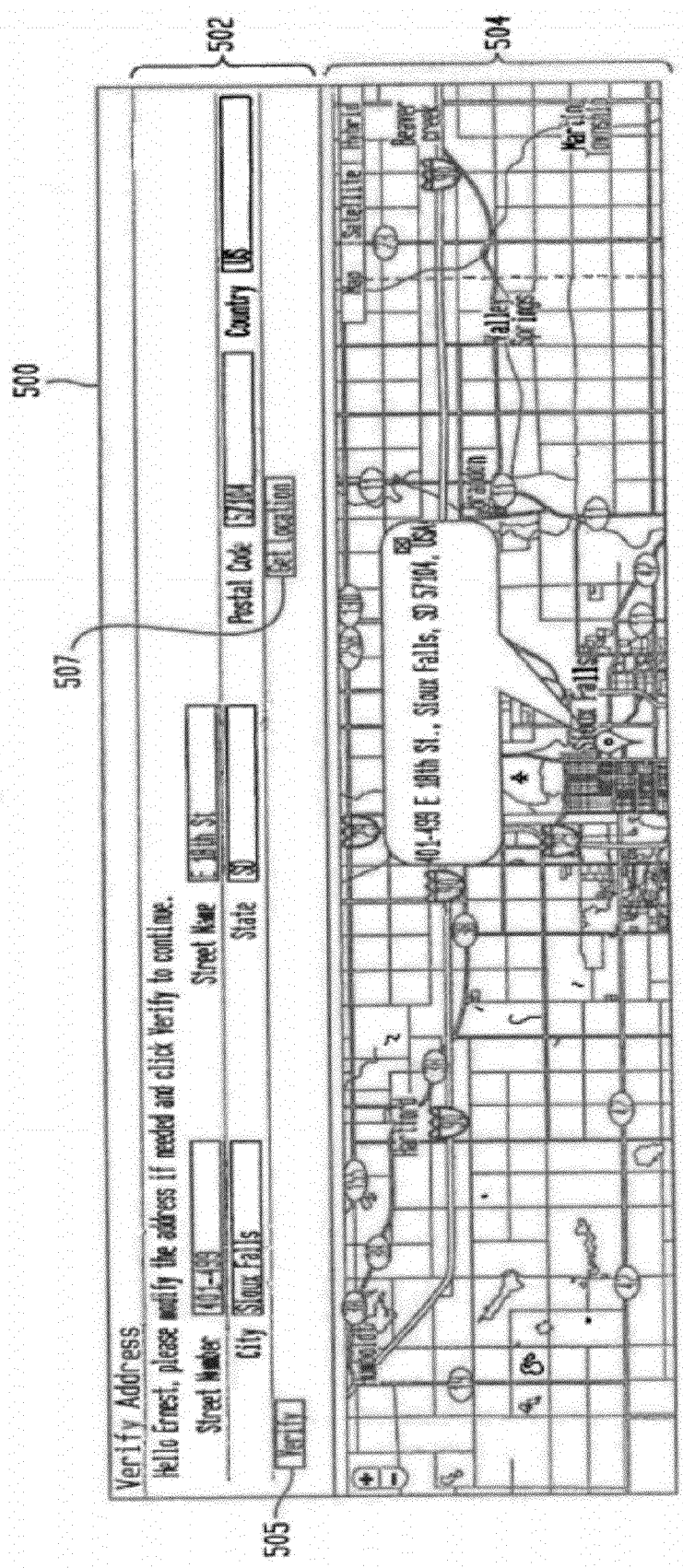
FIG. 5A is a screenshot illustrating a display view that may be presented to a user and that may enable the user to enter record information according to an example.

FIG. 5A is a screenshot illustrating a display view 500 that may be presented to a user and that may enable the user to enter record information according to an example embodiment. The display view 500 may be presented to a user and may allow the user to verify an address associated with the user's (device's) location. Display view 500 may include a top portion 502 and a bottom portion 504. The top portion 502 may include a panel populated with information relating to a determined current location of a user (111) operating a mobile computing device (110). The top portion may include a panel with user interface elements 505 and 507 that allow the user to verify and get (update) the user's location, respectively. In other example embodiments, the user may manually edit the location information displayed about the user's location. In other example embodiments, the location information as shown in top portion 502 may include additional and/or different location information.

According to an example embodiment, if the user selects the verify command 505, the system may then present or otherwise provide additional information about the geographical location of the user. For example, as discussed above, verifying the location may result in presenting the user with a list of businesses within a specified geographical area, direction and/or radius of the user. The following is an example URL that may be generated upon a selection of the verify command:

https://c.na7.visual.force.com/apex/
footprintsearch?acc=40&city=Sioux+
Falls&country=US&lat=43.4974555&lon=-
96.6820043&state=SD&stName=E+57th+
St&stNum=47627-47629&zip=57103

As may be seen in the above exemplary URL, the URL may include, embedded within it one or more text strings that correspond to the address of the user (111) and/or mobile computing device (110). Example text that may be included in the URL may include street name, state, street number, country, zip code, city. As may be seen, the URL above may also include longitudinal and latitudinal coordinates as well.

If the user selects the get location command 507, the system may update the first display 500 with an update of the user's current location. For example, it may be that the user has moved since the location as presented in the display view 500 has been displayed, and the mobile computing device has not updated the display view 500 to reflect the user's current location. This may allow the system to geotag any information provided by the user with the most up-to-date information and/or provide the user with more accurate information based on the user's specific location.

The bottom portion 504 of the display view 500 may display a map (or other graphic) view of the user's current location. The map may include an icon situated at or near the current geospatial location of the user. The map may include a mapping of the area surrounding a user's current geospatial location. The map may include a street map, topology map, zoning map and/or other map that the user may find useful. According to an example embodiment, the user may toggle between different kinds of maps to view in the bottom portion 504.

The user may select the map and zoom into the map to find out more detailed information, e.g., street layout and other map information relating to the list of addresses found in the top panel portion 502. The user may also zoom out to view a broader scope of the geographical area. The icon located at the position in the map corresponding to the current geospatial location of the user, may allow the user to quickly and/or more easily identify and/or verify the user's current location with respect to the user's geographical surroundings. In a further example, an assignment area for a particular user may also be displayed. Designations for listings assigned to a user for verification can also be displayed in display view 500 in either top or bottom portion 502, 504 as desired. This allows a user to easily view his or her assigned verification listings, or assigned areas to other users. An assignment area for example could appear as shaded or labeled polygons (e.g. 'Mar 21 week assignment area') or may include a set of individual listings assigned to a respective user, which is a subset of the full listing database. Displaying these assignments as dots or flags on a map would help users understand where to go to fulfill their assignments.

Returning to FIG. 4, at step 420, in response to a verify command selection by the user, one or more display views may be displayed that may enable the user to enter record information for addresses corresponding to the current location of the mobile computing device. The display view(s) may include a user interface element, such as a get location user interface element (button or other control) that may enable the user to update a current location. FIG. 5B shows an example display view that may be used in step 420.

FIG. 5B is a screenshot illustrating a display view 510 that may be presented to a user and that may enable the user to enter record information according to an example embodiment. The display view 510 may include a display of a list of businesses with street address and other location and/or contact information with one or more tags that may enable a user to verify information associated with the businesses, individually and/or as a group. For example, the businesses may be near each other and may part of a shopping mall or other retail complex and as such, attributes of the retail complex that apply to one business may likewise be applied to one or more of the other businesses.

The get location command 507 of FIG. 5B may perform a similar function as that described above with respect to the get location command 507 of FIG. 5A. The user may select the new address command 515 to add new address information. For example, if a business that the user sees is not listed in the view 510. The following is an example URL that may be generate as result of a user selecting the new address command 515:

https://c.na7.visual.force.com/apex/
footprinteditlite?acc=40&city=Sioux+
Falls&country=US&lat=43.4974555&lon=-
96.6820043&state=SD&stName=E+57th+
St&stNum=47627-47629&zip=57103

The example URL, as may be seen above, may include the longitudinal and latitudinal information of the user when the command 515 was selected. The URL may also include a closest or best-estimation street address as discussed above. If this information is incorrect, the user may have opportunities, as discussed herein, to modify the information associated with the new address.

FIG. 5C is a screenshot illustrating a display view 520 that may be presented to a user and that may enable the user to enter record information according to an example embodiment. The display view 520 may include additional and/or different elements, such as pull-down menus that allow a user to select and/or sort information to be verified, by categories. Amongst the exemplary pull-down menus in display view 520 are business category, business specialty, business category type and business sub-specialty. It should be understood that the elements, commands and other appearances or visual characteristics of the displays as appearing in the screen shots are exemplary only, and that in other embodiments other elements and/or layouts may be used. For example, additional and/or different categories may be used in the display 520, or for example, fill-in-boxes or radio buttons may be used.

According to an example embodiment, a user may select the next command 525 and be presented with a display view similar to the display view 530 of FIG. 5D. FIG. 5D is a screenshot illustrating a display view 530 that may be presented to a user and that may enable the user to enter record information according to an example embodiment.

The display view 530 may include text entry boxes associated with the record information that may allow the user to enter some or all of the record information associated with one or more businesses. As referenced above, the data entry that may be performed by the user via display view 530 may include verifying existing data, editing existing data, adding new data, and/or deleting data.

To facilitate data entry, a user may be presented with listings of preexisting data to enable a user to edit or modify the data based on the user's observations at the user's current location. For example, a user standing in front of a particular business, e.g. a restaurant, may be presented with information that has been collected about the restaurant, including but not limited to for example, the address of the restaurant, the name of the restaurant and the location of the restaurant. In certain example embodiments, if the data includes a known conflict or requires certain information, the user may be notified of these particular aspects.

The user may then make one or more observations about the restaurant while standing at a restaurant entrance. Using the mobile computing device, the user may then verify, edit, add to, and/or delete the data. For example, the user may add the current operating hours of the restaurant to the data, the user may edit public amenity information about the geographic area around the restaurant such as the presence of handicap access, water fountains, banking machines, automatic teller machines (ATMs), etc. Once the user has entered the information into the edit page, the user may select a submit command 539 or other user interface element or that initiates submitting the entered record information. In other example embodiments, the user may select the save command 535 to save the current changes made to the data (without submitting it) and/or may cancel 537 to undo one or more changes the user may have made to the record information.

Returning to FIG. 4, after the user has entered information (e.g., as described in respect to FIG. 5D) and submitted and/or saved the data, at step 430 the data as entered/changed by the user may be automatically geotagged. For example, a geographic and/or geospatial (GIS) tag corresponding to the current location on the mobile computing device may be added or otherwise associated with the entered record information. The geotagged record information, as described above with respect to step 334 (of FIG. 3) may be sent to the administrative computing device (120) and eventually be used by the GIS information manager (260) to update the GIS database (125). Updates may be sent in real-time as a user enters data. Alternatively, updates may be locally cached at a mobile device (110) and uploaded in batches to GIS information manager (260) at certain time intervals or upon completion of a certain number of entries, for example. This batch uploading can reduce waiting time for page refreshes and address problems with data reception when connectivity is slow, intermittent or interrupted.

According to an example embodiment, a GIS information manager (260) may be coupled to a GIS database (125). This coupling may be local or it may be remote across one or more networks. The GIS information manager (260) may then update the record information in the GIS database (125) with the record information entered by users (111) of one or more mobile computing devices (110). Other web services, such as map services (132), directory services (134) and/or any other remote web services (136) may be granted access to the GIS database (125). Access to the GIS database (125) may allow these services (132, 134, 136) to claim the benefits of more accurate GIS information collected and/or verified by the user(s) (111).

In a further embodiment, the GIS information manager (260) may automatically assign confidence scores indicative of a relatively high confidence for the entered record information received from users (111). In particular, the GIS information manager (260) may assign confidence scores indicative of relatively high confidence for data entry records that have been entered and/or verified by a user (111) and automatically geotagged (by the mobile computing device 110). Different embodiments may include any and/or varying number of confidence scores for updating the data. For example, a confidence score may have a range of 0 to 1 where 1 may be considered higher than a score of 0, which may indicate that a user and/or data with the higher confidence score is associated with higher confidence in the accuracy of the data and/or registered user (111). Different values, scales, or ranges of confidence scores, thresholds or other comparisons may be used depending upon a particular application to further assess and indicate the relative confidence associated with the accuracy of the data and/or registered user ability. Further data processing may be done to give higher confidence scores for users known to have more experience or have a track record of successful data entry. Likewise, new users or users without a track record of accuracy may be given a moderate or lower confidence value when compared to more experienced and/or accurate users.

By allowing the user (111) to move with a mobile computing device (111) and position himself or herself in front of or near a variety of businesses across one or more geographic areas, the user (111) may easily collect more accurate data and enter data as record information may be automatically geotagged and sent for appropriate update and storage in a GIS database (125). This system of record information entry and geotagging is very scalable and may be used with many different users (111), operating many different mobile computing devices (110) across a variety of locations. This may allow a large volume of (more accurate) record information to be entered, updated and otherwise verified in the GIS database (125). The order of steps 410-440 and components performing the steps are presented here for clarity and the steps may be performed in a different order by different components as would be apparent to a person skilled in the art given the description herein.

While examples are given here with respect to business information, it is understood that other example embodiments may include other types information, including but not limited to residences, points of interest, landmarks, neighborhood features, neighborhood amenities, and other information related to a geographical location. In examples, users can also to enter data for record information including entering text, adding photos, videos, audio recordings, hyperlinks, or other content or references to content.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for managing a collection of geographical information system (GIS) data over a network, comprising:
   receiving a universal resource locator passed from a browser of a mobile computing device, wherein the universal resource locator includes geospatial location information that specifies a current geographical location of the mobile computing device;

parsing the universal resource locator to obtain the geospatial location information;

identifying a list of businesses within a region at the geographical location;

sending the identified list of businesses to the browser;

receiving geotagged record information from the browser, wherein the geotagged record information includes record information associated with the listed businesses and entered by a user of the browser based on observations made by the user at different locations corresponding to the respective listed businesses and includes geographical tags having geospatial location information that specifies the current geographical location of the mobile computing device at the time of user record information entry;

updating data of a database based on the received geotagged record information; and automatically assigning a confidence score indicative of a relatively high confidence for the data updated based on the received geotagged record information.

2. The method of claim 1, further comprising storing the updated data and the assigned confidence score in a storage device coupled to the administrator computing device.

3. The method of claim 1, further comprising storing the updated data and assigned confidence score in a storage device that can be accessed by a remote web service.

4. The method of claim 1, wherein the record information includes data parameters, the data parameters including business name, business address, business operating characteristics data, neighborhood features, and amenities data, and wherein updating comprises storing the data parameters in one or more records along with the geospatial location information.

5. A system for managing a collection of geographical information system (GIS) data over a network, comprising:
an administrator computing device having an GIS information manager; and
a GIS database coupled to the administrator computing device,
wherein the GIS information manager:
receives a universal resource locator passed from a browser of a mobile computing device, wherein the universal resource locator includes geospatial location information that specifies the current geographical location of the mobile computing device,
parses the universal resource locator to obtain the geospatial location information,
identifies a list of businesses within a region that includes the geographical location of the obtained geospatial location information,
outputs the identified list of businesses to the browser,
receives the geotagged record information from the browser, wherein the geotagged record information includes record information associated with the listed businesses and entered by a user of the browser based on observations made by the user at different locations corresponding to the respective listed businesses and includes geographical tags having geospatial location information that specifies the current geographical location of the mobile computing device at the time of user record information entry outputs updates to data stored in the GIS database based on the received geotagged record information, and automatically assigns confidence scores indicative of a relatively high confidence for the updates to the data, wherein the confidence scores are based on the received geotagged record information.

6. The system of claim 5, wherein the GIS database includes a storage device and the GIS database further stores the updated data and assigned confidence scores in records in the storage device.

7. The system of claim 5, wherein the GIS database is configured to be accessed by a remote web service.

8. The system of claim 5, wherein the record information includes data parameters, the data parameters including business name, business address, business operating characteristics data, neighborhood features, and amenities data, and the updated data stored in storage device includes the data parameters stored in one or more records along with the geospatial location information.

9. A method comprising:
receiving a list of businesses within a region of a geographical location of a mobile computing device, wherein the list of businesses is determined from a universal resource locator passed from a browser of the mobile computing device, and wherein the universal resource locator includes geospatial location information that specifies a current geographical location of the mobile computing device;
enabling a user through the browser at the mobile computing device to enter record information associated with the listed businesses based on observations made by the user at different locations corresponding to the respective listed businesses;
automatically geotagging the record information entered by the user to obtain geotagged record information having geographical tags including geospatial location information that specifies the current geographical location of the mobile computing device at the time of user record information entry; and sending the geotagged record information from the browser to a remote administrator computing device for storage in a GIS database, wherein a confidence score indicative of a relatively high confidence is assigned to the geotagged record information based on the geographical tags.

10. The method of claim 9, further comprising:
obtaining geospatial location information from a location determination unit in the mobile computing device based upon one or more of GPS, Wifi, or cell tower location information associated with the mobile computing device;
assembling the universal resource locator that includes the geospatial location information; and
passing the universal resource locator from the browser of the mobile computing device to the administrator computing device, whereby the administrator computing device processes the universal resource locator and returns the list of businesses to the browser for verification by the user.

11. The method of claim 10, wherein the obtaining, the assembling and the passing are performed prior to user data entry.

12. The method of claim 10, wherein the obtaining, the assembling and the passing are performed in response to a selection by a user at a user interface element in the browser at about the time of data entry before the automatically geotagging.

13. The method of claim 10, further comprising:
displaying a first display view having a map including an icon representing the current geographical location of the mobile computing device and street address information associated with the current geographical location of the mobile computing device, a first user interface element that enables the user to initiate data verification, and a second user interface element that enables the user to initiate retrieval of a current location for the mobile computing device.

14. The method of claim 10, wherein the enabling of record information entry comprises displaying one or more display views, each display view allowing text entry and having a user interface element that enables the user to initiate retrieval current location for the mobile computing device.

15. The method of claim 9, wherein the enabling of record information entry enables entry of record information including data parameters, the data parameters including business name, business address, business operating characteristics data, neighborhood features, and amenities data, and wherein the updating comprises storing the data parameters in records along with corresponding geospatial location information.

16. The method of claim 10, further comprising:
displaying a display view having a map including an indication of an assignment area of the user.

17. The method of claim 16, further comprising:
displaying a display view having a listing of records assigned to the user for verification.

18. An apparatus, comprising:
a GIS data verifier, implemented on a mobile computing device having a browser and a location determination unit;
wherein the mobile computing receives a list of businesses within a region of a geographical location of the mobile computing device, wherein the list of businesses is determined from a universal resource locator passed from the browser of the mobile computing device, and wherein the universal resource locator includes geospatial location information that specifies a current geographical location of the mobile computing device;
wherein the GIS data verifier
enables a user through the browser at the mobile computing device to enter record information associated with the listed businesses based on observations made by the user at different locations corresponding to the respective listed businesses, and
automatically geotags the record information entered by the user to obtain geotagged record information having geographical tags including geospatial location information obtained by the location determination unit that specifies the current geographical location of the mobile computing device at the time of user record information entry; and
wherein a communication unit sends the geotagged record information from the browser to a remote administrator computing device for storage in a GIS database, wherein a confidence score indicative of a relatively high confidence is assigned to the sent geotagged record information.

19. The apparatus of claim 18, wherein
the geospatial location information is based upon one or more of satellite, network or cell tower location information associated with the mobile computing device from the location determination unit, and
wherein the GIS data verifier
assembles the universal resource locator that includes the determined geospatial location information and
passes the universal resource locator from the browser of the mobile computing device to the remote administrator computing device.

20. The apparatus of claim 18, wherein the GIS data verifier displays through the browser on a display screen of the mobile computing device a first display view having a map including an icon representing the current geographical location of the user and street address information associated with the current geographical location of the mobile computing device, a first user interface element that enables the user to initiate data verification, and a second user interface element that enables the user to initiate retrieval of current location for the mobile computing device.

21. The apparatus of claim 18, wherein the GIS data verifier initiates a display of one or more display views that enable record information entry, each display view allowing text entry and having a user interface element that enables the user to initiate retrieval of current location for the mobile computing device.

* * * * *